July 5, 1932.  W. TODD  1,866,520

BALL AND SOCKET JOINT

Filed Oct. 15, 1931

Inventor,
William Todd.
By William A. Millen
Attorney

Patented July 5, 1932

1,866,520

UNITED STATES PATENT OFFICE

WILLIAM TODD, OF LEOMINSTER, MASSACHUSETTS

BALL AND SOCKET JOINT

Application filed October 15, 1931. Serial No. 569,084.

The present invention relates to couplings or joints, and has particular reference to ball and socket connecting joints of the type, commonly employed in connecting the drag-links or tie-rods of a vehicle steering mechanism with the steering and pitman arms of the mechanism.

In automobile steering mechanisms, the drag-links and tie-rods are usually connected with their respective parts through ball and socket joints which vary somewhat in construction in various makes of automobiles. However, in all of such joints, of which the applicant has knowledge, one part of the joint consists of a tubular socket member having a slot therein enlarged at one end to receive a ball head or other enlargement of another connecting part. This ball head is held in the slot between suitable bearing surfaces by a yieldable means, preferably a helical spring, which moves and maintains the ball in the reduced portion of the slot, so that under ordinary conditions the ball is retaining in the slot against removable, thereby maintaining the connection.

However, owing to crystallization of the spring, breaking, or undue wear of the part, or other conditions, it frequently occurs that the ball becomes disconnected from the socket and pulls out of the enlarged end of the slot resulting in serious damage to property or injury to persons before the condition is realized.

The object of the present invention is the provision of a safety attachment, so constructed that, when it is assembled about the ball joint, it will be locked in position and cannot slide or fall off; and which has a slot therein through which the ball cannot pass, thus eliminating all possibility of a disconnected drag link or connecting rod.

A further specific object of the invention is the provision of a safety sleeve attachment for drag links and ball joints which has the reduced portion $e$ and a slot 37 provided in the body of the sleeve.

Other objects and features of the invention will appear as the description of the invention proceeds and which reside in the sundry details of construction, combination and arrangement of parts hereinafter more fully described and pointed out in the appended claims.

Referring in detail to the drawing which shows that the preferred embodiments of the invention as at present devised:

Figure 1:
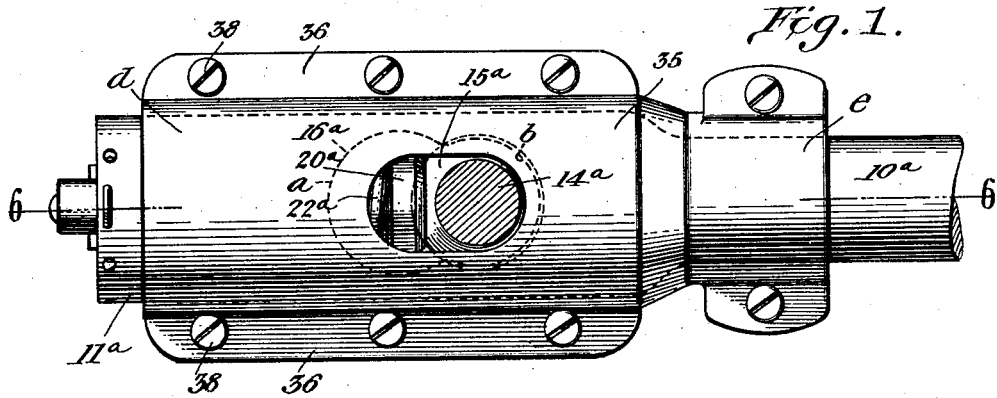
Figure 1 is an elevation of a modified form of the invention and adapted for attachment to couplings now in use.
Figure 2:
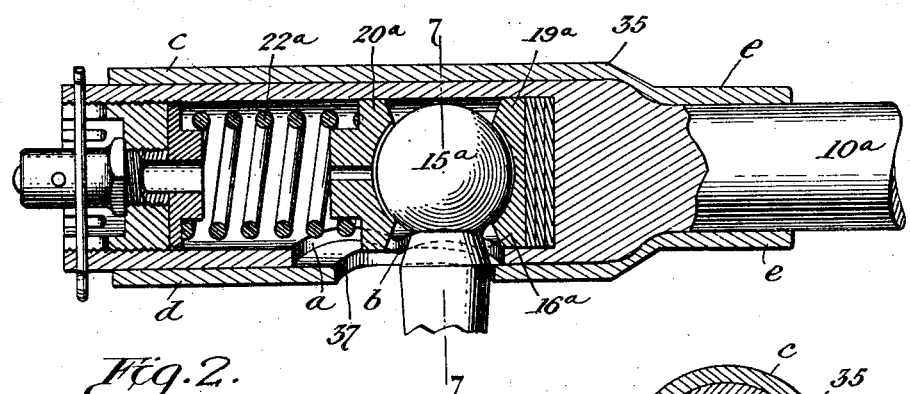
Figure 2 is a longitudinal sectional view taken substantially on line 6—6 of Figure 1.
Figure 3:
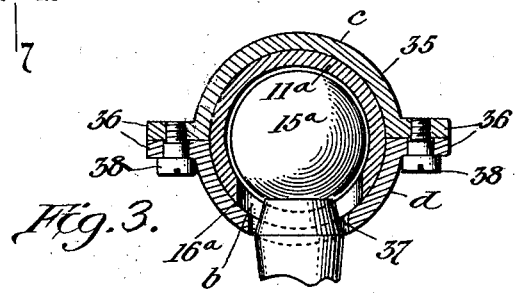
Figure 3 is a transverse sectional view taken substantially on line 7—7 of Figure 2.
Figure 4:
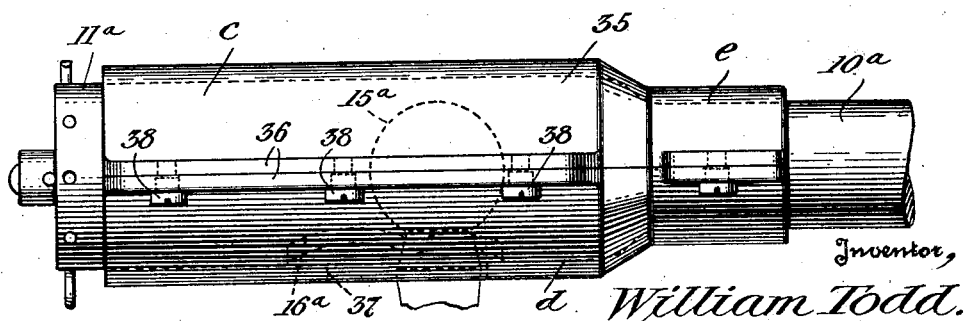
Figure 4 is an elevation of the invention in the position shown in Figure 2.

The present invention is shown as consisting of an attachment adapted to apply to ball and socket joints of the type now commonly in use in automotive steering mechanisms, these joints including a rod $10a$ provided with a tubular socket end $11a$ for retaining the ball of a stud arm $14a$. The ball is yieldably held in position in the socket between bearing plates 19A and 20A disposed in the tubular portion or socket 11 A, as is ordinarily the present practice. The outer end of the tubular socket is in turn threaded and receives a threaded cap nut or plug which closes said end, and a compression spring 22A is interposed between a cap nut and the bearing 20A for the purpose of pressing said bearing against the ball 15A, and, consequently, the latter against the bearing plate 19A. However, the elongated opening $16a$ in the side wall of the socket has an enlargement $a$ which will permit the ball $15a$ to be inserted in and removed from the socket 11, the spring $22a$ forcing and maintaining the ball in the reduced end $b$ of the slot $16a$.

As before stated, due to breakage of parts, crystallization of the spring $22a$, undue wear, or sudden jolts or shocks, the ball $15a$ frequently becomes disengaged and is withdrawn through the enlarged end $a$ of the slot $16a$, thus disconnecting the stud $14a$ from the rod $10a$. The attachment consists of a sleeve 35 formed of two complemental parts or sections $c$ and $d$ of such form and shape as to embrace and surround the exterior surface of the tubular portion $11a$ and having a reduced portion $e$ which will embrace and clamp the exterior surface of the rod 10$a$, so that the sleeve 35 is held tightly against displacement. The clamping of the sections may be accomplished in any convenient manner, but for the purposes of the present illustration, each of the sections $c$ and $d$ is shown as having lateral extending flanges 36 along their longitudinal edges provided with aligned openings for receiving thread bolts or other fasteners 38 for securing the sections together.

The section $d$ of the sleeve is formed with an elongated slot 37 which preferably extends longitudinally thereof and is of less diameter than the ball 15$a$ so that should the ball become disengaged, for any reason whatsoever, from between the bearings 19$a$ and 20$a$ it will not be disconnected from the rod 10$a$.

From the above it will be seen that a very simple and economical structure has been provided which will insure at all times the positive engagement between the connecting parts of the ball and socket joint irrespective of the condition of the compression spring, or of the bearing plates of the socket joint.

In this specification and the annexed drawing, the invention is disclosed in the form in which it is considered to be the best, but the invention is not limited to such form because it is capable of being embodied in other forms; and it is to be understood that in and by the claims following the description herein it is intended to cover the invention in whatever form it may embody within the scope thereof.

Having thus described the invention, what is claimed is:

1. A safety attachment for ball and socket joints of drag links and connecting rods, which comprise a tubular socket member and an externally reduced portion inwardly from the outer end of the socket, said socket having a slot therein through which a headed shank may be inserted and removed, said attachment including a longitudinally split casing adapted to extend about said tubular socket and having an internally reduced portion corresponding to and to engage with the reduced portion of said joint, means for fastening the split portions of the casing together, said casing having a slot therein to permit the shank to extend therethrough and of a width less than the diameter of the said head of the shank, whereby the head of said shank is locked in said socket.

2. A safety attachment for ball and socket joints of drag links and connecting rods, which joints comprise a tubular socket member having a reduced extension projecting from the inner end thereof and a slot therein through which a headed shank may be inserted and removed, said attachment including a sleeve composed of complemental longitudinal sections adapted to fit about said socket end of links or rods, and having an internally reduced portion to embrace and engage said reduced extension of the joint, and further having outwardly extending flanges on their longitudinal edges, and means for engaging and connecting said flanges of opposite sections and drawing the same together for clamping the sections about the socket, whereby said sleeve is locked against accidental displacement from the socket, link or rod, one of said sections having an opening therein through which said shank may extend, and of less width than the diameter of the head of the shank, whereby the shank is locked against withdrawal from the socket.

In testimony whereof I hereunto set my hand.

WILLIAM TODD.